(12) United States Patent
Palko et al.

(10) Patent No.: US 10,459,987 B2
(45) Date of Patent: Oct. 29, 2019

(54) DATA VIRTUALIZATION FOR WORKFLOWS

(71) Applicant: Red Hat, Inc., Raleigh, NC (US)

(72) Inventors: Kimberly Palko, Hudson, NH (US); Kenneth W. Peeples, Martinez, GA (US); Prakash Aradhya, Nashua, NH (US)

(73) Assignee: Red Hat, Inc., Raleigh, NC (US)

( * ) Notice: Subject to any disclaimer, the term of this patent is extended or adjusted under 35 U.S.C. 154(b) by 856 days.

(21) Appl. No.: 14/615,857

(22) Filed: Feb. 6, 2015

(65) Prior Publication Data
US 2016/0232235 A1    Aug. 11, 2016

(51) Int. Cl.
| | |
|---|---|
| *G06F 16/24* | (2019.01) |
| *G06F 16/951* | (2019.01) |
| *G06F 16/21* | (2019.01) |
| *G06F 16/23* | (2019.01) |
| *G06F 16/2452* | (2019.01) |
| *G06F 16/2458* | (2019.01) |
| *G06Q 10/06* | (2012.01) |
| *G06F 16/245* | (2019.01) |

(52) U.S. Cl.
CPC .......... *G06F 16/951* (2019.01); *G06F 16/211* (2019.01); *G06F 16/2365* (2019.01); *G06F 16/245* (2019.01); *G06F 16/2452* (2019.01); *G06F 16/2471* (2019.01); *G06Q 10/06* (2013.01)

(58) Field of Classification Search
CPC ..................... G06F 17/30545; G06F 16/2471
See application file for complete search history.

(56) References Cited

U.S. PATENT DOCUMENTS

| | | | |
|---|---|---|---|
| 5,428,737 A * | 6/1995 | Li | G06F 17/30398 |
| 6,012,053 A * | 1/2000 | Pant | G06F 17/30696 |
| 6,718,320 B1 * | 4/2004 | Subramanian | G06F 17/30463 707/719 |
| 7,383,355 B1 | 6/2008 | Berkman et al. | |

(Continued)

OTHER PUBLICATIONS

Halevy, et al.; "Enterprise Information Integration: Successes, Challenges and Controversies"; University of Washington; Nasa Ames; Callixa; BEA Systems; Microsoft Corporation; Network Inference; Mitre Corporation; SAP; http://me.jtpollock.us/pubs/2005.06-eiisigmod05.paper.pdf; 2005, 10 pages.

(Continued)

*Primary Examiner* — Robert W Beausoliel, Jr.
*Assistant Examiner* — Nirav K Khakhar
(74) *Attorney, Agent, or Firm* — Lowenstein Sandler LLP (57) ABSTRACT

Systems and methods for enhancing workflows with data virtualization. An example method may comprise: executing, by a processing device, a workflow comprising a conditional statement; performing a query in view of the conditional statement, the query employing virtualized data access to a plurality of heterogeneous data sources conforming to different data source schemas; transforming, by the processing device, data items returned by the query into a resulting data set conforming to a certain schema, wherein the data items correspond to the different data source schemas; and evaluating the conditional statement in view of the resulting data set.

15 Claims, 4 Drawing Sheets

(56) References Cited

U.S. PATENT DOCUMENTS

| | | | |
|---|---|---|---|
| 7,580,946 B2 | 8/2009 | Mansour et al. | |
| 7,702,636 B1* | 4/2010 | Sholtis | G06F 17/30566 |
| | | | 707/999.1 |
| 8,037,106 B2 | 10/2011 | Barrenechea | |
| 8,296,433 B2 | 10/2012 | Stevens et al. | |
| 8,595,344 B2 | 11/2013 | Bhatt et al. | |
| 2003/0033182 A1* | 2/2003 | Stok | G06Q 10/063 |
| | | | 705/7.11 |
| 2005/0120051 A1* | 6/2005 | Danner | G06F 17/30592 |
| 2011/0066629 A1* | 3/2011 | Escalante | G06F 17/30864 |
| | | | 707/765 |
| 2011/0087673 A1* | 4/2011 | Chen | G06F 17/30864 |
| | | | 707/748 |
| 2012/0215763 A1* | 8/2012 | Hughes | G06F 17/30545 |
| | | | 707/718 |
| 2013/0166490 A1 | 6/2013 | Elkins et al. | |
| 2013/0166963 A1 | 6/2013 | Stoyanov | |

OTHER PUBLICATIONS

Foster, et al.; "Grid Services for Distributed System Integration"; http://mindproject.googlecode.com/svn/trunk/Accumulation/Unified%20Monitoring%20Tool/Paper/Grid%20services%20for%20distributed%20system%20integration.pdf; Jun. 2002; 10 pages.

Ewa Deelman; "Grids and Clouds: Making Workflow Applications Work in Heterogeneous Distributed Environments"; USC Information Sciences Institute,Marina Del Rey, CA 90292, USA; The International Journal of High Performance Computing Applications, 2009, http://www.researchgate.net/publication/220457261_Grids_and_Clouds_Making_Workflow_Applications_Work_in_Heterogeneous_Distributed_Environments/file/9c96051a3a011a202e.pdf; 15 pages.

* cited by examiner

DATA VIRTUALIZATION FOR WORKFLOWS

TECHNICAL FIELD

The present disclosure is generally related to data virtualization, and is more specifically related to enhancing a workflow using data virtualization.

BACKGROUND

Organizations often develop computer based workflows to describe how to process information and to enable a computer to assist or automate tasks that were previously performed by one or more users. The workflows may include operations that gather information from a data source and evaluate the data to fulfill organizational activities.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for enabling a workflow to utilize data virtualization to retrieve, transform, unify and evaluate data from multiple heterogeneous data sources. Data virtualization may be any approach to data management that provides access to data without requiring technical details about the underlying data source, such as how the data source is formatted (e.g., schema) or where it is physically located. Data virtualization may reduce the complexity of the workflow by providing the workflow with a unified interface to interact with the multiple heterogeneous data sources without using the native interface of each data source. In one example, a workflow may include a database query that utilizes data virtualization to access multiple heterogeneous data sources, such as relational databases, flat file systems or web services. Data virtualization may be used to translate the database query into multiple data retrieval commands that are specific to each heterogeneous data source (e.g., source specific commands). Subsequent responses to the data retrieval commands may be transformed based on the data virtualization into a resulting data set that may be used by the workflow.

Various aspects of the above referenced methods and systems are described in details herein below by way of examples, rather than by way of limitation.

"Workflow" herein shall refer to a sequence of operations (e.g., conditional statements, instructions, comparisons, query commands) that analyze, evaluate and transform data. In one example, a workflow may be a business process that describes tasks and the interconnection between tasks and may be used to provide a service or product to a customer.

"Heterogeneous Data Sources" herein shall refer to data sources that run on different hardware platforms, use different network protocols, or have different software to manage their data stores (e.g., different database management systems (DBMS)). Heterogeneous data sources may also have different information request languages (e.g., query languages), different query capabilities and different data models. Each heterogeneous data sources may handle errors differently or may provide different transaction semantics. In one example, the heterogeneous data sources may have different versions of software with the same or different database schemas. In another example, heterogeneous data sources may include a relational database, a structured flat file, web service and/or a data warehouse.

"Virtualized data access" herein shall refer to accessing data using a unified interface without requiring technical details about the data, such as how it is formatted (e.g., schema) or where it is physically located. In one example, this may enable a workflow to initiate a single database query using a standardized query language to gather data from multiple heterogeneous data sources, such as a flat file system and the web service.

A system that provides virtualized data access to workflows may be advantageous over previous systems because it may allow a workflow to utilize the unified interface and avoid the inclusion of customized tasks with different access mechanisms to accommodate heterogeneous data sources. For example, previous systems may have one customized task to gather information from a database using a database query in the appropriate query language and another customized task may gather information from a text file using a script for accessing the relevant portion of the text file. The need to create customized tasks may be burdensome and may discourage task automation.

Figure 1:
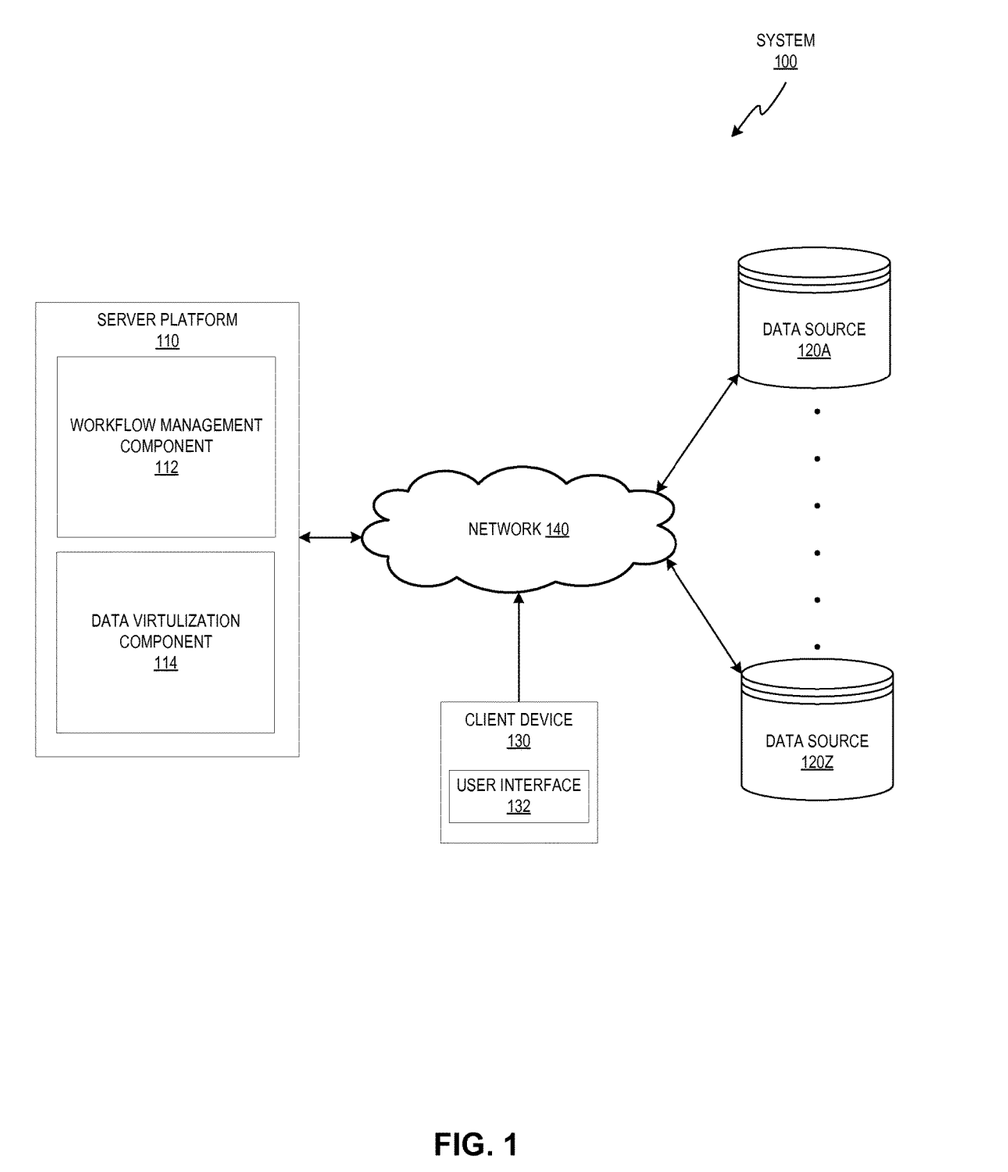
FIG. 1 depicts a high-level diagram of an example system architecture in accordance with one or more aspects of the present disclosure.

FIG. 1 illustrates an example system architecture 100, in accordance with an implementation of the disclosure. The system architecture 100 includes a server platform 110, data stores 120A-120Z and a client device 130, which may be interconnected to one another by network 140. In one implementation, the network 140 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Server platform 110 may include workflow management component 112 and data virtualization component 140, which may interact with one another to execute workflows that may gather data from data sources 120A-Z. Workflow management component 112 may store workflows and schedule, process and monitor their execution. A workflow may include a sequence of operations (e.g., conditional statements, instructions, comparisons, query commands) that analyze, evaluate and transform data. The workflows may be created or modified by users functioning as a workflow designers and may be executed without being compiled. For example, the workflow may include statements that may be invoked and interpreted, similar to a script file, and therefore may not need to be compiled in order to execute.

Data virtualization component 114 may provide workflow management component 112 with virtualized data access to a plurality of data sources. The virtualized data access may allow a workflow to retrieve and manipulate data without requiring the workflow to include technical details about the data or data source, such as how the data or data source is formatted (e.g., schema) or which data source contains the information. The virtualized data access may provide a unified view of the data using a unified interface. The unified interface may be a uniform application programming interface (API) and may be based on a standardized database retrieval technology, such as Java Database Connectivity (JDBC) or Open Database Connectivity (ODBC). In an alternative example, the uniform interface may be based on a web services interface. The queries submitted to data virtualization component 114 may be translated and transferred to the data sources at runtime, according to data models discussed in more detail below.

Data sources 120A-Z may include a variety of different data sources that may be accessed by workflow management component 112 using data virtualization component 114. Data sources 120A-Z may be heterogeneous data sources that differ from one another in some way, for example, the data sources may run on different hardware platforms, use different network protocols, or have different software to manage their data stores (e.g., different database management systems (DBMS)). Heterogeneous data sources may also have different information request languages (e.g., query languages) and different data models. Each heterogeneous data sources may handle errors differently or may provide different transaction semantics. In one example, the heterogeneous data sources may have different versions of software with the same or different database schemas. In another example, heterogeneous data sources may include a relational database, a structured flat file, web service and/or a data warehouse.

Client device 130 may include a user interface 132 that may interact with workflow management component 112 and data virtualization component 114 and may allow a user to create workflows and data views. In one example, user interface 132 may include a graphical modeling tool that a user (e.g., IT administrator, operations analyst) can utilize to create or modify a workflow. The workflow and view may be created and executed without being compiled.

Figure 2:
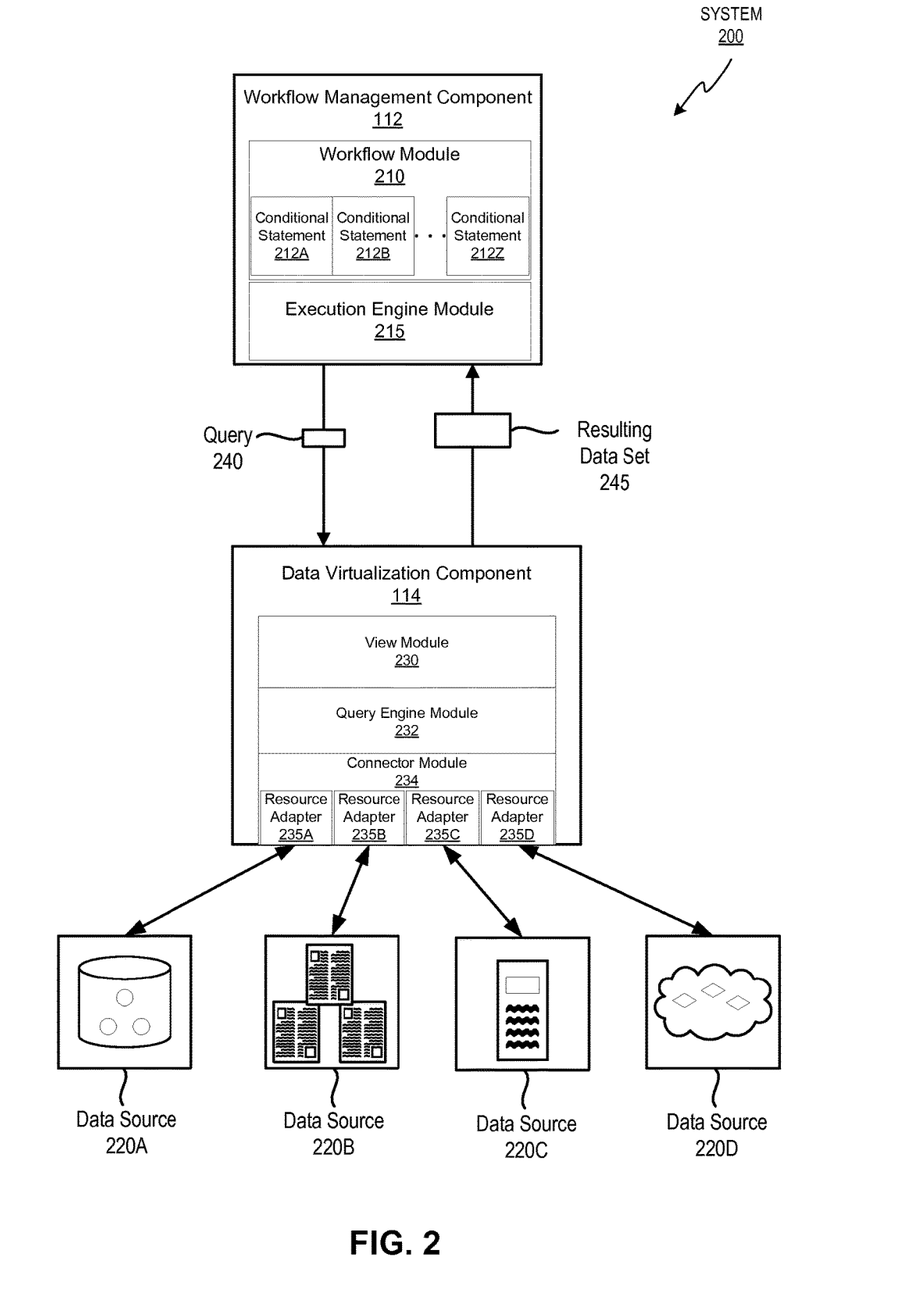
FIG. 2 depicts a block diagram of an illustrative embodiment of a workflow management component and a data virtualization component in accordance with one or more aspects of the present disclosure.

FIG. 2 depicts a block diagram of an exemplary system 200 that includes workflow management component 112 and data virtualization component 114 and illustrates interactions between these components, in accordance with one or more aspects of the present disclosure. Workflow management component 112 may include a workflow module 210, conditional statements 212A-Z and an execution engine module 215. Data virtualization component 114 may include a view module 230, a query engine module 232 and a connector module 234, which may be communicably coupled to data source 220A (e.g., relational database), data source 220B (e.g., flat file system) and data source 220C (e.g., web service), data source 220D (e.g., distributed data source). More or less components or modules may be included without loss of generality. For example, two or more of the modules may be combined into a single module, or one of the modules may be divided into two or more modules. In one implementation, one or more of the modules may reside on different computing devices (e.g., different server computers, on a single client device, distributed among multiple client devices, etc.).

Workflow management component 112 may store, plan, schedule, process and monitor the execution of workflows. Workflow module 210 may include a workflow with a sequence of operations that retrieve, analyze, evaluate and transform data (e.g., information internal or external to an organization). The sequence of operations may include conditional statements 212A-Z, which may include statements (e.g., if-then or if-then-else statements) that determine the existence of a condition and may indicate a corresponding action (e.g., operation). The conditional statement may have one or more operators and one or more operands. The operators may include logical connectors such as equals (=), greater than (>), less than (<), or other similar operator. The operands may include variables that correspond to data, such as data received from one or more data sources. The conditional statement may be represented visually as shapes or as text or some combination of both. In one example, a workflow may be used to analyze and assess an insurance applicant (e.g., user) and the sequence of operations (e.g., conditional statements) may utilize data received from the user, such as name, age, gender, address, job title and may gather additional information (e.g., driving record, criminal background) from one or more data sources.

Execution engine module 215 may provide a runtime environment for the workflow. The runtime environment may include mechanisms to interpret and execute the conditional statements. The mechanisms may analyze a portion of the conditional statement and determine whether the corresponding information has been retrieved or can be retrieved. To retrieve information, execution engine module 215 may access a corresponding rule or set of rules, which may be used to generate query 240.

Query 240 may include one or more virtual query commands to gather information from data virtualization component 114. A virtual query command is a query command that complies with the unified interface of data virtualization component 114. Query 240 may be transmitted from workflow management component 112 to data virtualization component 114 and may be formatted based on a database schema or a web services schema. The database schema may include or be based on a Structured Query Language (SQL), HiveQL or other similar query language. The web service schema may include or be based on Representational State Transfer (REST), Open Data Protocol (OData), Simple Object Access Protocol (SOAP) or other similar technology.

Data virtualization component 114 may receive and analyze query 240 and may send multiple queries to multiple data sources 220A-D to retrieve information for a workflow. Data virtualization component 114 may provide virtualized data access for workflow management component 112. As shown in FIG. 2, data virtualization component 114 may include view module 230, query engine module 232, connector module 234 and resource adapters 235A-D.

View module 230 may include a view composed of various data models and configuration information that describe data sources 220A-D and how the data sources 220A-D are to be integrated. The data models may correspond to the data format of the data source and may include source models and view models. The source models may be used to represent the structure and characteristics of the data sources. The view models may represent the structure and characteristics of the integrated data. The view may be utilized by the query engine 232 to determine how to form source specific queries (e.g., data retrieval commands). View module 230 may also receive responses (e.g., tat items), directly or indirectly, from data sources 220A-D and may transform and aggregate the responses into query response 240, which may be transmitted to the workflow management component 112.

Query Engine 232 may receive query 240 and may convert query 204 into one or more source-specific query commands. Each source-specific query command may be transmitted to the appropriate data source via connector module 234. The appropriate data sources may be identified by query 240 or may be determined based on the mappings between source and view models.

Connector module 234 may receive the source-specific query commands and may include one or more resource adapters 235A-D. Each of the resource adapters 235A-D may communicate with a respective data source 235A-D utilizing an appropriate technology, such as a device driver, software application (e.g., database management system DBMS)), data retrieval format (e.g., database query language) or other similar technology or combination of technologies. In one example, the connector module 234 may implement a certain data access interface, such as for example, Java Database Connectivity (JDBC) or Open Database Connectivity (ODBC).

Data sources 220A-D may include a variety of heterogeneous data sources that utilize different data schemas. In one example, the data schema may determine the logical structure of a data source and determine the manner data can be stored, organized, and manipulated. Heterogeneous data schemas may utilize different data schemas, such as a relational data schema (e.g., data source 220A), a flat file data schema (e.g., data source 220B), a web services data schema (e.g., data source 220C), a distributed data schema (e.g., data source 220D) or a similar data schema such as a hierarchical data model, network data model or object-oriented data model.

Data source 220A may employ a relational data schema. The relational data schema may be an unordered collection of unique, non-duplicated items that are represented by tuples, which may be grouped into relations. A tuple may be an ordered set of attribute values, such as an attribute name and type name. An attribute value may be a specific valid value for the type of the attribute, such as a scalar value. In one example, the data source 220A may be a relational database that is accessible using a database query language that is the same or different from the query language of the virtual query commands.

Data source 220B may employ a flat file data schema, which may utilize one or more flat files stored in a computing file system. The flat file may be a plain text file or a binary file with textual information (e.g., spread sheet). The computing file system may be: a disk or local file system, such as extended file system (EXT), journaling file system (JFS), new technology file system (NTFS), file allocation table (FAT); a network or client-server file system, such as Network File System (NFS); or other similar file system. In one example, the data virtualization component 114 may read the flat file in its entirety from the computing file system to access a portion of the information and after a modification occurs the file may be written out in its entirety to the file system.

Data source 220C may employ a web service schema, which may include a web application programming interface (Web API) for providing web services. The web service may allow a device to communicate with a remote device via a shared common communications protocol, such as Hypertext Transfer Protocol (HTTP) or other similar networking protocol. The web service schema may utilize HTTP operations, such as GET, POST, PUT, DELETE to retrieve information from servers and send new updated information back to the servers. In one example, the web services schema may be based on a Representational State Transfer (REST), Simple Object Access Protocol (SOAP) or other similar web service architecture.

Data source 220D may employ a distributed data storage schema, which may include a distributed file system such as Hadoop distributed file system (HDFS). The distributed data storage schema may split files into large blocks (e.g., 64 MB or 128 MB) and may distribute the blocks between multiple nodes of a cluster. The files may be split and processed using a Map Reduce technology. The distributed data storage schema may provided a mechanism for storage and retrieval of data that is modeled in means other than the tabular relations used in relational databases (e.g., relational schema), for example, it may utilize a non-relational schema such as Not Only SQL (NoSQL).

System 200 may be advantageous to prior systems because it may assist workflow execution in a plurality of different scenarios for a variety of different organizations. For example, the technology within this disclosure may be useful for an insurance company to optimize the workflow associated with a new insurance applicant. In this example, an insurance organization may decide that in order to operate more effectively, it may want to improve the company's data analysis. The company may want a more comprehensive and accurate view of data relating to its customers and associated factors contributing to the company's risk management and overall business strategy.

This may be accomplished by using workflow management component 112 and data virtualization component 114 discussed above. The company may store customer information in a first type of data source on the company network and may gather an assortment of data from other sources. The other sources may include, for example, occurrences of fire and flood across the nation provided by a government entity (e.g., Federal Department of Emergency Services). The government entity may store the information online using a second type of data source that uses a different database technology. Another source may be the average building costs in metropolitan and regional areas for each state, which may be provided by several state Building Associations, some of which are stored in online databases and others stored as downloadable text files. The average building cost sources may be maintained independently and therefore the tables may not have standard column names and metrics. For example, some tables may refer to "cost" and others may refer to "price." Some costs may be provided per meter whereas others may be given per millimeter for the same materials.

The company may configure a workflow to utilize the data virtualization component 112, which may include resource adapters for the different types of data sources. The company may employ a user interface 132 to create source models for each of data sources by, for example, importing metadata from each source. The users may also design view models that may be utilized by the data virtualization component to reconcile semantic differences regarding the meaning, interpretation and intended use of data across the source models. In one example, all of the integrated tables may present the cost of materials as a cost as a common measurement (e.g., dollar per meter). The users may also create multiple views that may be customized to present the integrated data in certain schemas desired by users (e.g., analysts). The users may access all of the data they require with a single API, allowing them to focus their efforts on applying advanced analytical techniques, without concern for the physical whereabouts, or technical or semantic differences between the multiple data sources.

As discussed above, system 200 may be useful in the insurance industry, but may also be useful in any other field, such as technical support call centers. For example, data virtualization component 114 may provide a workflow with virtual data access to disparate data sources. The data sources may include an external technical support data source, an internal-only knowledge base, customer relationship management data source and a customer service data source. An organization may design a workflow that utilizes the virtualized data access and presents the information in a dashboard to the call center employees to assist them when diagnosing a caller's problem.

Figure 3:
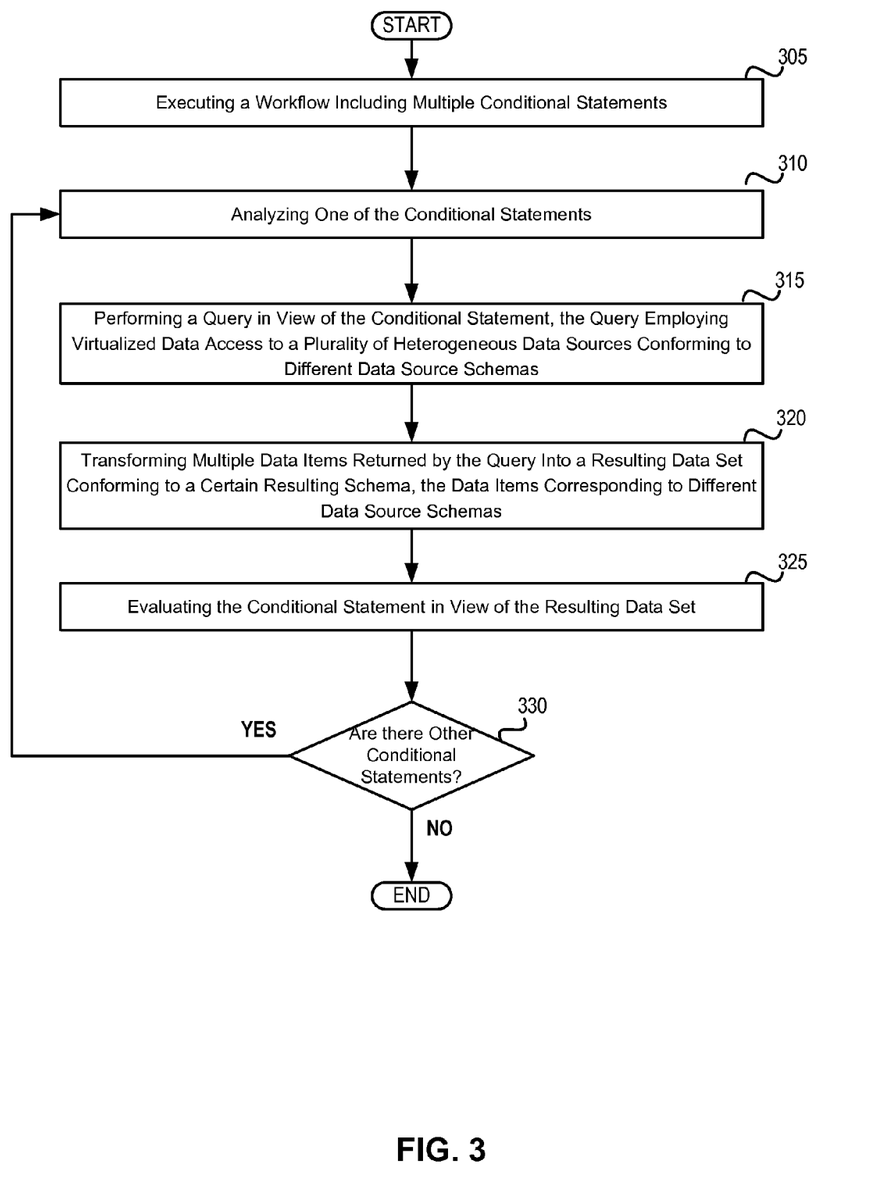
FIG. 3 depicts a flow diagram of an example method of a workflow management component utilizing data virtualization to enhance the execution of a workflow in accordance with one or more aspects of the present disclosure.

FIG. 3 depicts a flow diagram of one illustrative example of a method 300 for processing a workflow that utilizes data virtualization. Method 300 may be performed by processing logic that may comprise hardware (e.g., circuitry, dedicated logic), software (such as is run on a general purpose computer system or a dedicated machine), or a combination of both. Method 300 and each of its individual functions, routines, subroutines, or operations may be performed by one or more processors of the computer device executing the method. Method 300 may be performed by processing logic of a client device or a server device.

At block 305, the processing logic may execute a workflow including multiple conditional statements. The conditional statements may include multiple operators and operands organized in, for example, a when-then statements (e.g., if-then) that indicates an action (e.g., operation) when a condition occurs.

At block 310, the processing logic may analyze one of the conditional statements. Analyzing the conditional statement may involve deconstructing the operators and operands and identifying whether additional data may be retrieved. The additional data may be local to the machine or remote from the machine, wherein being remote indicates that the data is stored on a device that is separate from the device analyzing the conditional statement. When additional data may be useful (e.g., needed for processing), the processing logic may evaluate the conditional statement in view of one or more rules to format a query to gather the additional data.

At block 315, the processing logic may perform a query in view of the conditional statement. The query may employ virtualized data access to access a plurality of heterogeneous data sources conforming to different data source schemas. The query may also be performed without applying a common schema to the heterogeneous data sources. In one example, performing the query may involve the processing logic translating the query into multiple data retrieval commands. The multiple data retrieval commands may be executed using multiple resource adapters that correspond to the heterogeneous data sources respectively. The data retrieval commands may include database queries, file read/write commands, http requests or other similar commands for the corresponding data source.

The virtualized data access may utilize data virtualization component 114 to provide a unified interface to access data within the heterogeneous data sources. The heterogeneous data sources may include a relational database, a web service, a flat file system, or a consumer relationship management (CRM) system or some combination. The data sources may be local or remote from the data virtualization component 114 and may be operated by the same entity that owns server platform 110 or a third party entity. In one example, the visualized data access may provide a uniform interface for multiple queries and each query may be for a different data source. In another example, the virtualized data access may provide a uniform interface that enables a workflow to initiate a single database query using a standardized query language to gather data from multiple heterogeneous data sources, such as the flat file system and the web service.

At block 320, the processing logic may transform data items returned by the query into a resulting data set conforming to a certain resulting schema and the data items may correspond to different data source schemas. In one example, the data virtualization component 114 may transform the data items returned because of the query using a view (e.g., unifying view). The view may be composed of various data models and configuration information that describe the data sources and how their data is to be integrated. The data models may correspond to the data schema of the data source and may include source models and view models. The source models may be used to represent the structure and characteristics of the data sources. The view models may represent the structure and characteristics of the integrated data and may include referential integrity rules for mapping and converting data items based on a mapping table or conversion table. The mapping table may identify data fields in corresponding data sources that are semantically equivalent, even though the field names or value types may be different. The conversion table may include information to convert values of different data fields to a common format, for example, values in one database may be in meters and values in another data base may be in millimeters. The common format may be related to names, identification data, weight, size, currency, temperature or other similar information.

At block 325, the processing logic may evaluate the conditional statement in view of the resulting data set. The conditional statement may evaluate to a value such as a true or false value or a numeric score (e.g., 1, 100) or character score (A or F).

At block 330, the processing logic may determine whether there are other conditional statements. When there are the method may branch back to block 310 to analyze the other conditional statements. When there are no more conditional statements the method may end.

Responsive to completing the operations described herein above with references to block 330, the method may terminate.

Figure 4:
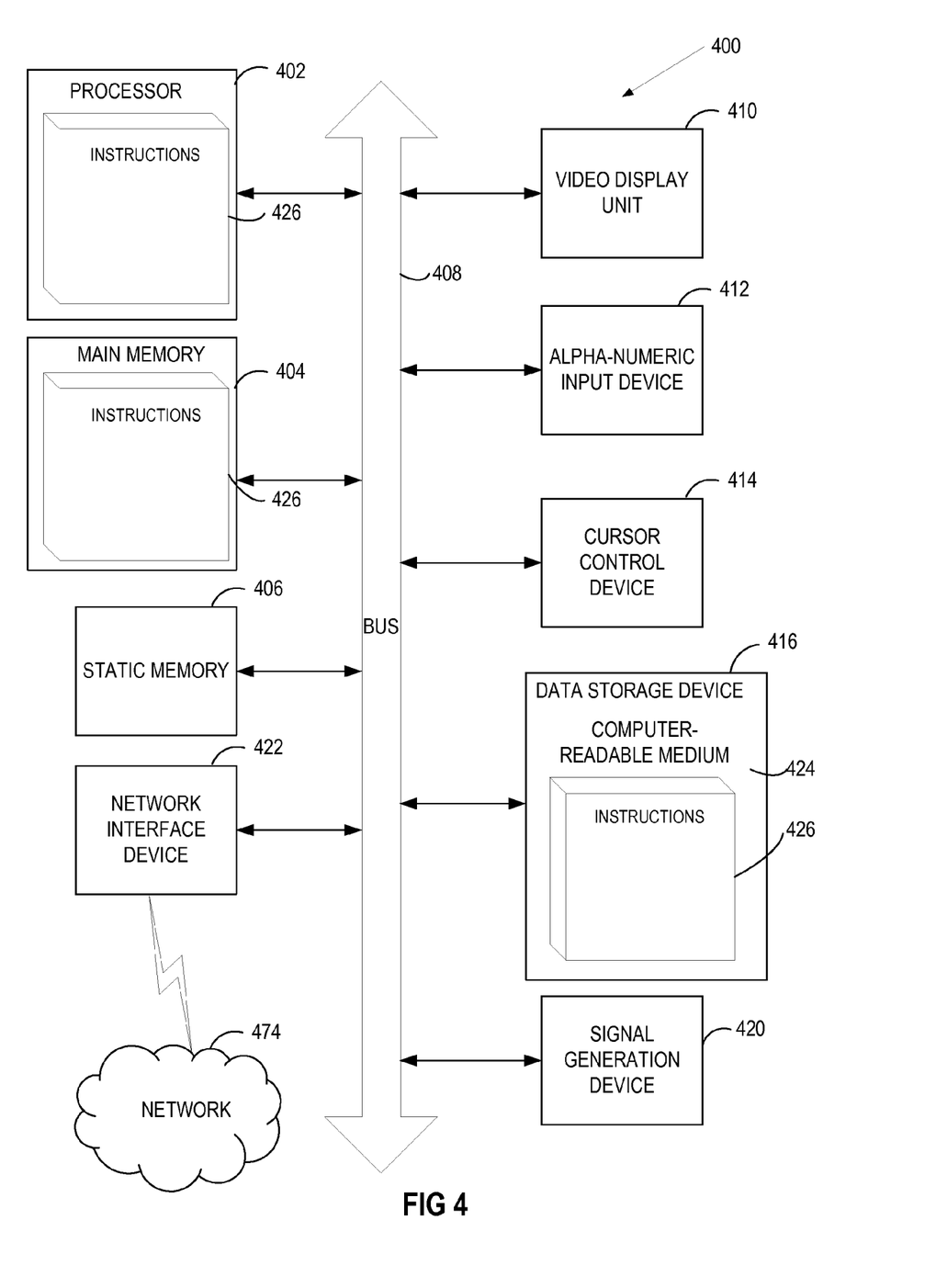
FIG. 4 depicts a block diagram of a computer system operating in accordance with one or more aspects of the present disclosure.

FIG. 4 depicts a block diagram of a computer system operating in accordance with one or more aspects of the present disclosure. In various illustrative examples, computer system 400 may correspond to example system 100 of FIG. 1.

In certain implementations, computer system 400 may be connected (e.g., via a network, such as a Local Area Network (LAN), an intranet, an extranet, or the Internet) to other computer systems. Computer system 400 may operate in the capacity of a server or a client computer in a client-server environment, or as a peer computer in a peer-to-peer or distributed network environment. Computer system 400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 400 may include a processor 402, a volatile memory 404 (e.g., random access memory (RAM)), a non-volatile memory 406 (e.g., read-only memory (ROM) or electrically-erasable programmable ROM (EEPROM)), and a data storage device 416, which may communicate with each other via a bus 408.

Processor 402 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 400 may further include a network interface device 422. Computer system 400 also may include a video display unit 410 (e.g., an LCD), an alpha-numeric input device 412 (e.g., a keyboard), and a cursor control device 414 (e.g., a mouse).

Data storage device 416 may include a non-transitory computer-readable storage medium 424 on which may store instructions 426 encoding any one or more of the methods or functions described herein, including instructions encoding workflow management component 112 or data virtualization component 114 of FIG. 1 implementing method 300.

Instructions 426 may also reside, completely or partially, within main memory 404 and/or within processor 402 during execution thereof by computer system 400, hence, main memory 404 and processor 402 may also constitute machine-readable storage media.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    executing, by a processing device, a workflow comprising a conditional statement;
    initiating a query in view of the conditional statement, the query employing virtualized data access to a plurality of heterogeneous data sources conforming to different data source schemas, the different data source schemas comprising a flat file data schema, a web service data schema, and a database schema;
    translating the query into a plurality of data retrieval commands, the plurality of data retrieval commands comprising a database query, an HTTP operation, and a file read operation;
    executing the plurality of data retrieval commands using a plurality of resource adapters corresponding to one or more of the plurality of heterogeneous data sources;
    transforming, by the processing device, data items returned by execution of the data retrieval commands into a resulting data set conforming to a certain schema, wherein the data items correspond to the different data source schemas; and
    evaluating the conditional statement in view of the resulting data set.

2. The method of claim 1, wherein the query comprises a single database query conforming to a standardized database query language and the workflow initiates the query to gather data from a data source comprising the flat file data schema, a data source comprising the web service data schema, and a data source comprising the database schema.

3. The method of claim 1, wherein the data items returned comprise a plurality of results from at least two of the plurality of heterogeneous data sources.

4. The method of claim 3, wherein the transforming the data items comprises resolving semantic differences between the plurality of query results by applying referential integrity rules to two or more data items that originated from the at least two of the plurality of heterogeneous data sources.

5. The method of claim 3, wherein the workflow is defined using a graphical modeling tool.

6. The method of claim 1, wherein the transforming the data items returned by the data retrieval commands are performed in real time.

7. The method of claim 1, wherein the virtualized data access comprises receiving data from a data source operated by a third party.

8. A non-transitory machine-readable storage medium storing instructions which, when executed, cause a processing device to:
  execute a workflow comprising a conditional statement;
  initiate a query in view of the conditional statement, the query employing virtualized data access to a plurality of heterogeneous data sources conforming to different data source schemas, the different data source schemas comprising a flat file data schema, a web service data schema, and a database schema;
  translate the query into a plurality of data retrieval commands, the plurality of data retrieval commands comprising a database query, an HTTP operation, and a file read operation;
  execute the plurality of data retrieval commands using a plurality of resource adapters corresponding to one or more of the plurality of heterogeneous data sources;
  transform, by the processing device, data items returned by execution of the data retrieval commands into a resulting data set conforming to a certain schema, wherein the data items correspond to the different data source schemas; and
  evaluate the conditional statement in view of the resulting data set.

9. The non-transitory machine-readable storage medium of claim 8, wherein the query comprises a single database query conforming to a standardized database query language and the workflow initiates the query to gather data from a data source comprising the flat file data schema, a data source comprising the web service data schema, and a data source comprising the database schema.

10. The non-transitory machine-readable storage medium of claim 8, wherein the data items returned comprise a plurality of results from at least two of the plurality of heterogeneous data sources.

11. The non-transitory machine-readable storage medium of claim 10, wherein to transform the data items returned the processing device is to resolve semantic differences between the plurality of results by applying referential integrity rules to two or more data items that originated from the at least two of the plurality of heterogeneous data sources.

12. The non-transitory machine-readable storage medium of claim 10, wherein the workflow are defined using a graphical modeling tool.

13. The non-transitory machine-readable storage medium of claim 8, wherein to transform the data items returned by the data retrieval commands are performed in real time.

14. The non-transitory machine-readable storage medium of claim 8, wherein the virtualized data access comprises the processing device to receive data from a data source operated by a third party.

15. A system comprising:
  a memory;
  a processing device communicably coupled to the memory, the processing device to execute instructions to:
  execute, by a processing device, a workflow comprising a conditional statement;
  initiate a query in view of the conditional statement, the query employing virtualized data access to a plurality of heterogeneous data sources conforming to different data source schemas, the different data source schemas comprising a flat file data schema, a web service data schema, and a database schema;
  translate the query into a plurality of data retrieval commands, the plurality of data retrieval commands comprising a database query, an HTTP operation, and a file read operation;
  execute the plurality of data retrieval commands using a plurality of resource adapters corresponding to one or more of the plurality of heterogeneous data sources;
  transform, by the processing device, data items returned by execution of the data retrieval commands into a resulting data set conforming to a certain schema, wherein the data items correspond to the different data source schemas; and
  evaluate the conditional statement in view of the resulting data set.

* * * * *